United States Patent [19]
Erb

[11] Patent Number: 4,809,569
[45] Date of Patent: Mar. 7, 1989

[54] ANTI-THEFT SYSTEM FOR ARTICLES SECURED BY RECESSED SOCKET HEAD THREADED FASTENERS

[76] Inventor: John C. Erb, 4019 Ponderosa Dr., Carson City, Nev. 89701

[21] Appl. No.: 139,586

[22] Filed: Dec. 30, 1987

[51] Int. Cl.⁴ ............................................. B25B 13/06
[52] U.S. Cl. .................................... 81/121.1; 81/460; 411/402; 411/910
[58] Field of Search .......... 81/121.1, 176.15, 436–439, 81/460, 461; 411/402, 403, 407, 409, 410, 411, 910, 911, 393

[56] References Cited

U.S. PATENT DOCUMENTS 465,175  12/1891  Geisirge ............................. 411/393
2,248,695  7/1941  Bradshaw ............................. 81/125
3,134,291  5/1964  Barrey ................................. 411/910

*Primary Examiner*—Frederick R. Schmidt
*Assistant Examiner*—Maurina Rachuba
*Attorney, Agent, or Firm*—Norman B. Rainer

[57] ABSTRACT

An anti-theft system is provided for articles such as modular equipment installed into vehicles with Allen type machine bolts. The system employs a monolithic insert member which is bonded within the hexagonally contoured depression in the head of the machine bolt, and has a protruding portion having a distinctively shaped keying configuration. A turning tool is provided having a handle and a shaft. The distal extremity of the shaft has a recess having a configuration adapted to receive the keying configuration of the insert member.

2 Claims, 1 Drawing Sheet

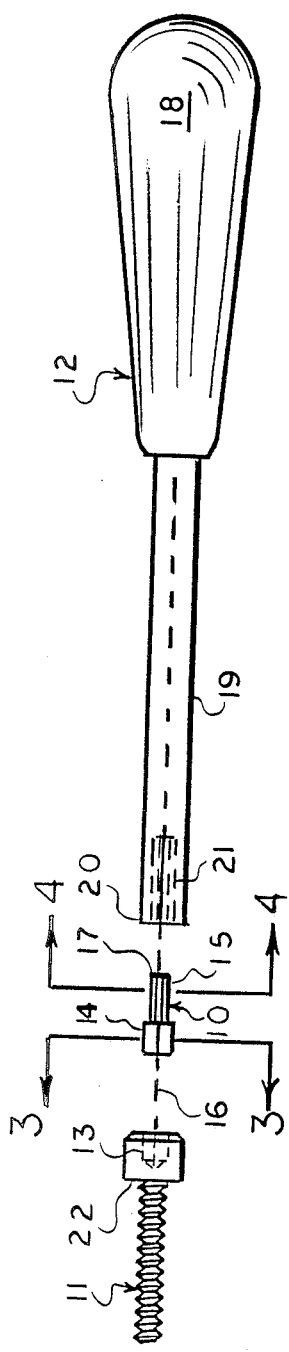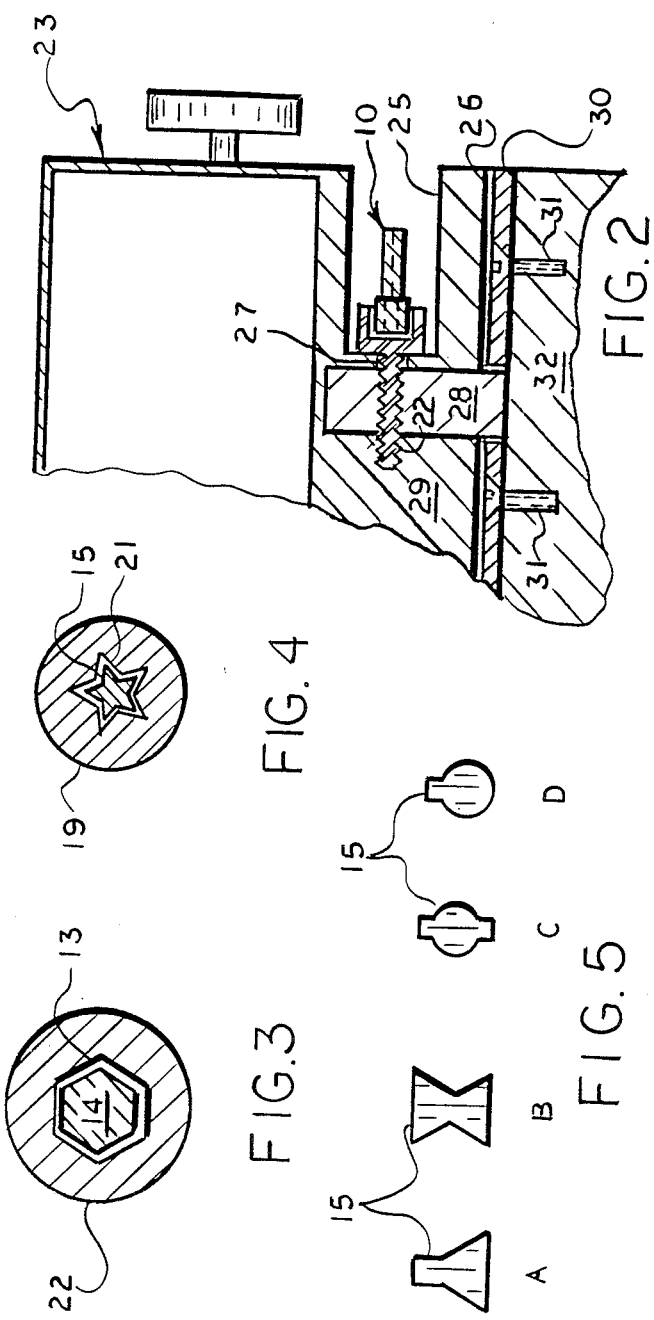

ANTI-THEFT SYSTEM FOR ARTICLES SECURED BY RECESSED SOCKET HEAD THREADED FASTENERS

BACKGROUND OF THE INVENTION

This invention relates to an anti-theft system employing threaded fasteners, and more particularly concerns specially modified threaded fasteners and an associated matching torque-producing driving tool in a lock-and-key relationship.

Electronic instruments of various types are generally installed in aircraft, boats and automotive vehicles as accessory equipment not originally incorporated during manufacture of the aircraft, boat or automobile. Such equipment is generally of modular configuration, adapted to be easily installed adjacent the pilot or driver. However, because of the often considerable value of such equipment, and the relative ease of mounting and removal, the equipment is at high risk of theft.

The installation techniques generally utilize machine bolts which engage receiving holes in the aircraft or vehicle or engage a rotatable locking latch built into the modular equipment. In the case of aircraft, instrument installatins are generally accomplished using bolts having a hexagonally shaped recess in their head, said bolts generally being called Allen bolts. In the use of Allen bolts for installation of modular equipment into aircraft cockpit panels, the head of the bolt is usually disposed in spaced apart relationship with respect to an overlying protective panel, and may in fact reside within a receiving channel extending from said protective panel. In either event, the head of the Allen bolt is generally not accessible except by the long-stemmed portion of an L-shaped Allen wrench whose hexagonal shaft closely seats within the recess of the head of the bolt. Such manner of mounting, however, is little deterrent to a thief.

Threaded fasteners having heads of special configuration which can be engaged only by a turning tool of matching configuration have been described in U.S. Pat. Nos. 2,248,695; 3,073,206; 1,188,305; 3,673,912; 3,872,904; and elsewhere. Such fasteners and their matching turning tools function is the manner of a lock and key principle because the fastener can be tightened or loosened only by the matching torque-producing turning tool. Bolts utilized in a lock-and-key relationship are effective only when a great number of specialized configurations are possible, as in the case of keys utilized for tumbler locks. However, the cost of fabricating short production runs of blots having various head configurations is prohibitively high.

It is accordingly an object of the present invention to provide a locking system comprising a threaded bolt and a matching turning tool to thwart unauthorized removal of modular equipment installed in aircraft, boats, automobiles and the like.

It is another object of this invention to provide a system as in the foregoing object capable of providing a lock-and-key principle of security and versatility.

It is a further object of the present invention to provide a system of the aforsaid nature amenable to low cost manufacture.

These objects and other objects and advantages of the invention will be apparent from the following description.

SUMMARY OF THE INVENTION

The above and other beneficial objects and advantages are accomplished in accordance with the present invention by a system comprising:

(a) a monolithic insert member comprising a base portion adapted to seat firmly within a contoured depression in the head of a machine bolt, and an upper portion having a distinctively shaped keying configuration, and (b) a turning tool having a handle, a shaft emergent from the handle in coaxial disposition therewith and terminating in a distal extremity, and a recess within said distal extremity having a configuration adapted to receive the keying configuration of the upper portion of the insert member.

In use, the base portion of the insert member is adhered within the contoured depression of a bolt such as an Allen bolt. The bolt, containing the insert member of this invention, is then utilized for installing modular equipment into a mobile vehicle such as an airplane, boat or automobile. In commercial distribution, the invention would have the format of a kit comprised of a number of insert members and a matching turning tool. Alternatively, the kit may be comprised of a number of Allen bolts having attached insert members, and a matching turning tool.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 1 is a side view of an embodiment of the system of the present invention shown in operative association with an Allen bolt.

FIG. 2 is a sectional side view of an Allen bolt modified in accordance with this invention and utilized in mounting modular equipment having a protective front panel and receiving channels for mounting bolts.

FIG. 3 is an enlarged sectional view taken along the line 3—3 of FIG. 1.

FIG. 4 is an enlarged sectional view taken along the line 4—4 of FIG. 1.

FIGS. 5a–5d exemplify alternative keying configurations.

DESCRIPTION OF THE PREFERRED EMBODIMENT

Referring to FIGS. 1–5, an embodiment of the locking system of the present invention is shown comprised of insert member 10, Allen bolt 11, and matching turning tool 12.

The Allen bolt or equivalent bolt has a shaped depression 13 of hexagonal prismatic contour in its head portion 22. The Allen bolt may be of varied shaft diameter and machine thread count.

Insert member 10, comprised of base portion 14 and upper portion 15, is fabricated of hardened steel having sufficient hardness to survive repeated torque levels for tighteneing the Allen bolt. Typical steel alloys that provide acceptable hardness include drill rod and Allen wrench stock. The base portion has a shape which closely conforms to depression 13. Upper portion 15 has a distinctively shaped keying configuration which may be characterized as either cylindric insofar as the shape is generated by the projection of a closed line path along the center axis 16 of the base portion, or tapered insofar as the cross-section of upper portion 15, taken in the direction perpendicular to axis 16, is smaller at its distal extremeity 17 than at its site of emergence from the base portion.

Turning tool 12 is comprised of handle 18 and shaft 19 emergent from the handle in coaxial alignment therewith. Shaft 19 terminates in a distal extremity 20 having an axially centered recess 21 whose internal cross-sectional configuration is a female match of the keying configuration of upper portion 15 of insert member 10. The length of recess 21 is preferably long enough to completely engage upper portion 15. In particularly preferred embodiments, the length of recess 21 is considerably longer than upper portion 15, the reason being to enable portions of the extremity of the tool to be cut off if its internal contour becomes stripped. This provides a fresh portion of recess 21 having an unblemished external keying configuration, thereby prolonging the life expectancy of the tool.

The base portion 14 of the insert member is adhered within the shaped depression 13 of the Allen bolt by means of strong, non-yielding bonding agent such as cyanoacrylates, epoxy resins, curable polyesters, and other bonding agents which transform from an initially fluid state to a solid state by a chemical cross-linking mechanism. Thermally applied bonding agents such as solders and other meltable solids may also be employed to secure the insert member to the head of the bolt.

The insert members may in general be fabricated by forging techniques or by automated machining methods. The recess 21 in shaft 19 of the turning tool may also be produced by forging methods.

FIG. 2 illustrates the use of a modified machine bolt 22 containing the insert member 10 of this invention. Machine bolt 22 is shown securing rotatable latch 28 housed within the base 29 of a unit of modular equipment 23. Latch 28, in the shown locking position, engages support tray 30 attached by bolts 31 to the chassis 32 of the aircraft or vehicle. When latch 28 is released and rotated 90 degrees, it permits removal of equipment 23 from tray 30. Receiving channel 25 is rearwardly disposed from front protective panel 26 as an integral portion of base 29 of the modular equipment. Bolt 22 enters channel 25 and penetrates threaded hole 27 in base 29 in a manner such that the head of the bolt abuts against the bottom of channel 25. The distal extremity of insert member 10 is rearwardly displaced with respect to panel 26. By virtue of such manner of use, bolt 22 cannot be removed by pliers, nor can the insert member be forcibly removed by a striking blow.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A kit comprised of:
   (a) a number of identical monolithic insert members, each comprising a base portion adapted to seat firmly within a contoured depression in the head of a machine bolt, and an upper portion having a distinctively shaped keying configuration, and
   (b) a turning tool having a handle, a shaft emergent from the handle and terminating in a distal extremity, and a single recess within said distal extremity having a cross-sectional configuration and length adapted to receive the keying configuration of the upper portion of the insert member and
   (c) a bonding agent for securing each insert member into the contoured depression in each machine bolt head.

2. A kit comprised of:
   (a) a number of Allen bolts, each having a hexagonally-shaped depression in its head portion and an insert member as defined in claim 1 bonded within said depression, each insert member being identical, and
   (b) a matching turning tool, as defined in claim 1.

* * * * *